Feb. 2, 1954 V. A. PECK 2,668,028
AIRCRAFT TAB CONTROL MECHANISM
Filed Dec. 10, 1949

Volney A. Peck
*INVENTOR.*

BY *James M. Clark*

HIS PATENT ATTORNEY.

Patented Feb. 2, 1954

2,668,028

UNITED STATES PATENT OFFICE 2,668,028

AIRCRAFT TAB CONTROL MECHANISM

Volney A. Peck, Los Angeles, Calif., assignor to North American Aviation, Inc.

Application December 10, 1949, Serial No. 132,315

11 Claims. (Cl. 244—82)

The present invention relates to aircraft controls and more particularly to improvements in control mechanism for control surface tabs and the like.

In the control of modern aircraft, particularly large aircraft or those which operate at higher speeds, it is frequently desirable that the control surfaces be provided with tabs in the region of the surface trailing edge. These control tabs may either be of the trim type in which they assist the pilot in trimming the airplane, or they may be of the servo type in which they assist the pilot in displacing the control surface upon which the tab is mounted.

The present invention is directed to improved irreversible control mechanism in what may preferably be a gear-driven dual lead screw arrangement which completely eliminates backlash or play within the mechanism in such manner that it is not subject to fluttering or other undesired vibration. The improved mechanism also provides the additional advantage of reducing the weight of the installation previously required by irreversible tab control devices and is such that the portion of its greatest weight may be installed ahead of the hinge centerline of the control surface whereby the weight of the unit may be used to advantage to provide a static balance for the control surface. Inasmuch as the mechanism utilizes dual lead screw elements, it further provides a considerable safety factor in the event of the complete failure of one of the operating elements.

It is, accordingly, a major object of the present invention to provide a fully irreversible control tab mechanism which completely eliminates backlash, free play and fluttering action due to these and other clearances and tolerances in the operating mechanism. It is a further object to provide a control tab installation which is of lighter construction than most irreversible mechanisms heretofore proposed and used. It is a corollary objective to provide such an installation which permits the location of the heavier portion of the mechanism ahead of the hinge centerline of the control surface whereby the weight of the unit may be used to advantage to provide a static balance for the control surface. A further object of the present invention is the elimination of the penalty previously occasioned by having such weight disposed so far aft in the movable control surface.

A further object resides in the provision of a control tab operating mechanism which utilizes dual operating elements to provide an increased safety factor whereby in the event of complete failure of one of the operating elements, the tab or other surface may be actuated through the remaining element. A further object resides in the provision of two operating lead screws or screw-jacks connected to opposite sides of the tab in such a manner as to permit pre-adjustment and pre-loading of the tab to any predetermined extent. A further object of the present invention lies in the provision of a simplified light weight dual mechanism which is readily accessible for servicing and desired adjustments for pre-loading or positioning of the tab surface.

Other objects and advantages of the present invention will occur to those skilled in the art after reading the present description, taken in conjunction with the accompanying drawings forming a part hereof, in which.

Figure 1:
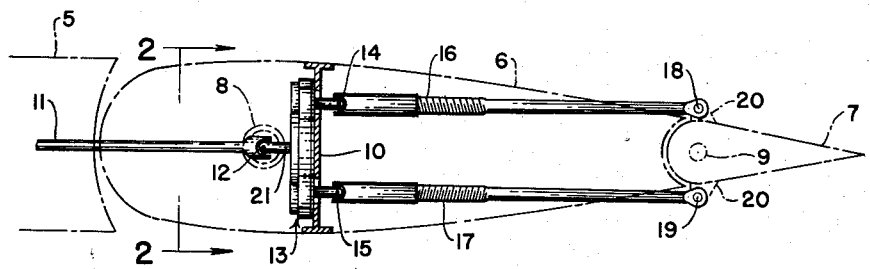
Fig. 1 is a cross-sectional view of a control surface and a tab to which a preferred form of the improved control mechanism has been applied.

Referring now to Fig. 1, the numeral 5 indicates the trailing portion of a relatively fixed fin or airfoil from which is pivotally mounted a control surface 6, which may be a rudder or other control surface. A tab surface 7, which may be either the trim or servo type, or both, is pivotally mounted at the trailing edge of the control surface 6, the latter having its pivotal mounting disposed at 8 and the tab having its pivot 9 supported from the trailing edge of the control surface. Slightly aft of the pivot 8, the control surface may be provided with a main transverse spar 10 to which the internal structure and the covering of the control surface may be suitably attached.

The tab 7 may be moved with respect to the control surface 6 by the rotation of the operating torque shaft 11 connected to the universal joint 12, imparting like rotation to the gearing within the gear housing or casing 13, which casing is fixedly attached to the web of the surface spar 10. The details of the gear unit 13 will be more particularly described in connection with Figs. 2, 3 and 4, and it may be sufficient at this point to state that a central gear, which is caused to rotate by the torque shaft 11, imparts rotation in the opposite direction to upper and lower pinions which are directly connected to the universal joints 14 and 15, respectively. The universal joint 14 has an internally threaded portion in engagement with the male threads 16 forming a lead screw or jack shaft connection between the upper pinion and the tab 7. A corresponding portion of the lower universal joint 15 is similarly internally threaded to be engaged by the threaded push-pull rod 17 to form a lead screw for connection to the lower portion of the tab 7.

The upper lead screw 16 is pivotally connected at the pivot 18 to the upper extension of the control horn 20, and the lower lead screw 17 is similarly pivotally connected at the pivot 19 to the lower portion of the control horn 20. The threads of the lead screw 16 are preferably right-hand threads, and those of the lead screw 17 are preferably left-hand, in order that one rod pushes rearwardly while the other rod will pull forwardly. Obviously, the upper threads could be left-hand pitch and the lower threads right-hand, just so long as the upper and lower threads are opposite to each other in pitch. This is necessitated by the fact that in the set of three gears within the gear unit 13 the rotation of the central gear in a given direction will cause both upper and lower pinions to rotate in the opposite direction, each pinion, of course, rotating in the same direction as the other pinion.

Figure 2:
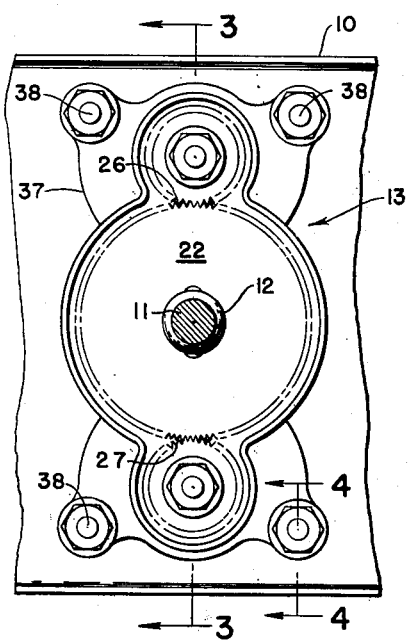
Fig. 2 is an enlarged view of the gear portion of the mechanism as viewed along the lines 2—2 of Fig. 1.
Figure 3:
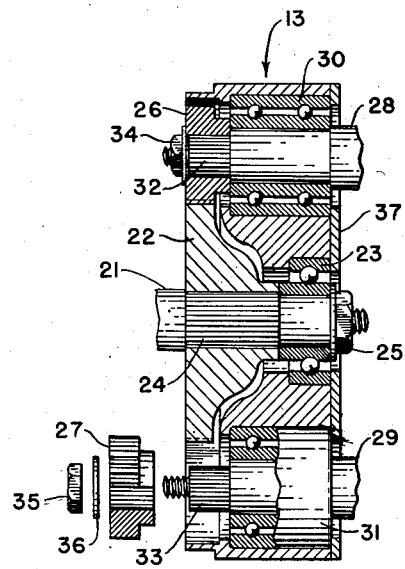
Fig. 3 is a cross-sectional view of the gearing as taken along the lines 3—3 of Fig. 2.
Figure 4:
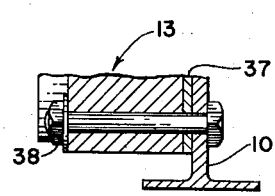
Fig. 4 is a fragmentary sectional view taken along the lines 4—4 of Fig. 2 showing the mounting of the gear housing to the control surface spar.

Referring now to Figs. 2, 3 and 4, it will be noted that the shaft 21, connected to the universal 12, has mounted upon its aft portion the central gear 22, and the anti-friction bearing 23 engaging its reduced diameter portion, the gear 22 being splined to the shaft as at 24 and the bearing 23 being retained together with the gear 22 by means of the lock nut 25. An upper pinion 26 substantially smaller in diameter than the central gear 22 is retained in rotational and meshing engagement with the central gear upon the shaft 28 together with the anti-friction bearing 30 by means of the splines 32 and the lock nut 34. Similarly, the lower pinion 27 is carried upon the forward terminal of the shaft 29 together with the bearing 31, being retained by the splined portion 33, the lock nut 35 and the washer 36. The driven shafts 28 and 29 extend rearwardly and form the forward halves of the universal joints 14 and 15, respectively. The gear casing 13 is suitably formed and machined to retain the bearings 23, 30 and 31, within suitably shouldered portions and the back portions of the gear casing may be closed by a plate member as indicated by the numeral 37. Both the plate member 37 and the main casing portion are preferably formed with extending ear or lug portions suitably apertured to receive the through bolts 38 by means of which the entire gear unit is mounted upon the web of the spar 10, as more particularly shown in Fig. 4.

Again referring to Fig. 1, it will be noted that the center of the universal joint 12 coincides with the axis of the pivot 8 for the control surface 6, whereby deflected positions of the control surface will not interfere with the accurate and uniform control of its auxiliary tab. The main universal joint 12, as well as the upper and lower universals 14 and 15, should preferably be of the constant-velocity type in order that angular rotation imparted to the torque shaft 11 will impart uniform and predetermined angular rotation to the central gear 22. The latter gear together with the upper and lower pinions 26 and 27, are each preferably provided with fine pitch teeth accurately designed and machined to minimize clearances and prevent undesired play or backlash. The lead screws or screw jacks 16 and 17 may be pre-adjusted to hold the tab 7 in any predetermined position with respect to a given operating position of the control drive in the cockpit which is connected to the control shaft 11. This pre-adjustment may be obtained by suitably adjusting the length of either or both of the screw jacks before connecting the same to the tab; or, preferably, the adjustment may be obtained by disengaging the central driving gear 22 and adjusting the pinion connected to the respective screw-jack desired to be adjusted by rotating the same until the trim tab is properly pre-loaded. Accordingly, the pre-adjustment of the two opposed screw-jacks, connected to the tab in such a way as to preload the same by a forward pull exerted at each of the pivots 18 and 19, provides in effect a couple action which may be maintained by re-insertion of the central gear 22 in meshing engagement with the pinions 26 and 27.

In the event clockwise rotation (looking rearwardly) is imparted to the torque shaft 11, similar clockwise rotation will be imparted to the central gear 22 as viewed in Fig. 2, and the pinions 26 and 27 will each be caused to rotate in the counterclockwise direction. Such rotation of the upper shaft 28 through the universal 24 and relative unthreading of the screw-jack 16 will push the pivot 18, and the tab 7, rearwardly and downwardly about the pivot axis 9. Similar counterclockwise rotation of the pinion shaft 29, its connected universal 15, and the threaded engagement with the screw-jack 17 will cause an equivalent forward pull to be exerted upon the lower pivot 19 imparting downward or clockwise rotation of the tab 7 as viewed in Fig. 1. Similarly, rotation of the torque shaft 11 in the opposite or counterclockwise direction as viewed in Fig. 2, will cause clockwise rotation of the universals 14 and 15 thereby imparting counterclockwise or upward movement of the tab 7 about its pivotal axis 9 as viewed in Fig. 1. It will be understood that the torque shaft 11 may be suitably connected to the tab control means located in the cockpit of the airplane convenient to the pilot and that other equivalent actuating mechanism such as control cables may be substituted for the torque shaft 11. The surface 6 will, of course, be provided with suitable mechanism (not shown) by which it also may be controlled by the pilot. It will also be noted that for any given setting of the tab 7 with respect to the control surface 6, the latter may be deflected into any desired positions with respect to the relatively fixed airfoil or wing 5 without affecting the relative positioning of the surface 6 and its tab 7.

It will, accordingly, be noted that the present arrangement provides a fully irreversible control mechanism which completely eliminates backlash. The installation shown and described provides a considerable advantage over previous mechanisms from the weight standpoint inasmuch as the gear unit may be installed ahead of the hinge centerline whereby the weight of the unit may be used to advantage to provide static balance for the control surface and the relative movement between the several parts of the installation is accommodated by the provision of the universal joint on the hinge centerline. Normally, in order to provide a fully irreversible control unit, such as by individually motor-driven screw jacks, a considerable penalty is occasioned due to having so much weight disposed so far aft within the movable surface. Difficulty has also been experienced in the past in properly holding the tab in operative position during flight without having play develop within the mechanism, and previous trim tab operating mechanisms have frequently been objectionable due to their permitting a fluttering action of the tab due to free play and tolerances within the operating mechanism. The improved device further provides a considerable safety factor over previous installations inasmuch as complete failure of one of the screw-jacks 16 or 17 will not impair operation of the tab inasmuch as the same may still be actuated through the remaining rod.

Other forms and modifications of the present invention, both with respect to its general arrangement and the details of its respective parts, which may occur to those skilled in the art upon reading the present description, are intended to come within the scope and spirit of this invention, as more particularly set forth in the appended claims.

I claim:

1. In an aircraft anti-flutter control system, a relatively fixed airfoil, a movable surface pivotally mounted upon said airfoil, a tab pivotally mounted upon said movable surface, a push-pull member operatively connected to said tab at one side of its pivotal mounting, control means including a meshing gear set for operating said push-pull member for the adjustment of said tab, said meshing gear set including a common drive gear and a pinion connected to said push-pull member, and anti-flutter means for taking-up play in the push-pull member connections and in said control means including a threaded member oppositely connected to said tab in respect to said push-pull member, said anti-flutter means including a thrust bearing assembly threadedly engaging said threaded member and a pinion element in meshing engagement with said common drive gear of said gear set and rotatively adjustable with respect to said thrust bearing assembly for pre-loading said push-pull member and said threaded member.

2. In an aircraft, a main surface, an auxiliary surface pivotally mounted upon said main surface, anti-flutter control mechanism for the actuation of said auxiliary surface comprising a threaded member operatively connected to a first side of said auxiliary surface, a second threaded member operatively connected to the opposite side of said auxiliary surface, and control means including a toothed pinion and a coupled sleeve nut in engagement with each said threaded member, a splined connection between one of said toothed pinions and its respective coupled sleeve nut to permit relatively rotative adjustments for the pre-loading of said mechanism, and a common toothed control gear meshing with each said pinion for maintaining said pre-loading while actuating said auxiliary surface.

3. In a play-free actuating mechanism for a pivotally mounted member subject to play in its pivotal connections, a first pulling means connected to one side of said member, a second pulling means connected to the opposite side of said member, a threaded element carried by the opposite terminal of each said pulling means, a first rotatable means threadedly engaging the threaded element of said first pulling means, a second rotatable means threadedly engaging the threaded element of said second pulling means, a toothed pinion fixedly attached to said first rotatable means to rotate therewith, a second toothed pinion mounted for both axial and rotative adjustment with respect to said second rotatable means for normally being rotated therewith in the actuation of said member, said pinions journalled for rotation about spaced parallel axes, and a driving gear intermediately journalled for meshing engagement with both said pinions, said second pinion arranged for temporary disengagement from said intermediate gear for rotation of said second rotatable means for the pre-tensioning of both said pulling means whereby upon re-engagement of said second pinion with said intermediate gear said member may be pivotally rotated under a pre-tensioned condition of said mechanism free from play in its pivotal connection.

4. In an anti-flutter actuating mechanism for a pivotally mounted member subject to flutter characteristics resulting from play in its pivotal connections, a first pulling means connected at one terminal to one side of said member, a second pulling means connected at one terminal to the opposite side of said member, a threaded element carried by the opposite terminal of each said pulling means, a first rotatable means threadedly engaging the threaded element of said first pulling means, a second rotatable means threadedly engaging the threaded element of said second pulling means, a toothed pinion fixedly attached to said first rotatable means to rotate therewith, a second toothed pinion adjustably mounted for both axial and rotative adjustment with respect to said second rotatable means for normally being rotated therewith, said pinions journalled for rotation about spaced parallel axes, a driving gear intermediately journalled for meshing engagement with both said pinions, and means including a splined connection between said second pinion and a portion of said second pulling means arranged for temporary disengagement of said second pinion from said intermediate gear for adjusting rotation of said second rotatable means for pre-tensioning of both said pulling means whereby upon re-engagement of said second pinion with said intermediate gear said member may be pivotally rotated under a pre-tensioned condition of said mechanism free from play in its pivotal connections and accompanying flutter characteristics.

5. In an anti-flutter actuating mechanism for a pivotally mounted member subject to flutter characteristics resulting from play in its pivotal connections, a first pulling means connected at one terminal to one side of said member, a second pulling means connected at one terminal to the opposite side of said member, a threaded element carried by the opposite terminal of each said pulling means, a first rotatable means threadedly engaging the threaded element of said first pulling means, a second rotatable means threadedly engaging the threaded element of said second pulling means, said second rotatable means having a splined portion, a toothed pinion fixedly attached to said first rotatable means to rotate therewith, a second toothed pinion adjustably mounted for both axial and rotative adjustments with respect to said second rotatable means for normally being rotated therewith in the actuation of said member, said pinions journalled for rotation about spaced parallel axes, said second pinion having a splined hub of greater axial length than the length of its toothed portion, and a driving gear intermediately journalled for meshing engagement with both said pinions, said second pinion arranged for temporary disengagement from said intermediate gear by axial movement along its splined connection for rotation of said second rotatable means for the pre-tensioning of both said pulling means whereby upon re-engagement of said second pinion with said intermediate gear said member may be pivotally rotated under a pre-tensioned condition of said mechanism free from play in its pivotal connections and accompanying flutter characteristics.

6. The combination with a movable control surface, a tab pivotally mounted upon said control surface, a pair of threaded members of opposite pitch separately attached to said tab on opposite sides of the pivotal mounting of said tab upon said control surface, and rotary tab actuating means including a pinion operatively connected to each of said threaded members and a common intermeshing gear for simultaneously imparting rotation to each of said threaded members, one of said pinions arranged to be rotatively adjustable with respect to said common gear for changing the relationship of said rotary means with respect to one of said threaded members for pre-loading both said members for minimizing flutter of said tab about its pivotal mounting upon said control surface.

7. In aircraft, a main surface, an auxiliary surface pivotally mounted upon said main surface, control mechanism for the actuation of said auxiliary surface comprising a first threaded member operatively connected to a first side of said auxiliary surface, a second threaded member of opposite pitch operatively connected to the opposite side of said auxiliary surface, actuating means including a pinion operatively connected to each said threaded member and a driving gear common to and meshing with each said pinion for rotating each of said threaded members in the same direction, one of said pinions arranged to be rotatively adjustable with respect to said common driving gear for changing the relationship of said actuating means with respect to one of said threaded members for pre-loading both of said members for minimizing flutter of said auxiliary surface about its pivotal mounting upon said main surface.

8. In an anti-flutter aircraft control system, a main airfoil, a control surface pivotally mounted upon said main airfoil, a tab pivotally mounted upon said control surface, a first threaded member pivotally connected to a first side of said tab, a second threaded member of opposite pitch pivotally connected to the opposite side of said tab, and gear means including first and second gears operatively connected to said first and second threaded members respectively, said gear means including a central drive gear engaging said first and second gears, the operative connection of said first gear to said first threaded member being splined to permit relative rotational adjustment of said first gear with respect to said central drive gear for pre-tensioning both said threaded members for minimizing flutter tendencies within the control system.

9. In aircraft, a movable tab, a control mechanism for said movable tab including a pair of threaded members of opposite pitch separately connected to opposite sides of said movable tab, a gear train including first and second gears separately connected to each of said threaded members, said gear train including a central actuating gear in meshing engagement with said first and second gears, said gear train arranged to transmit rotary control movements applied to said central actuating gear simultaneously and in the same direction to each said threaded member for displacement of said tab, the first of said gears being adjustably connected to the corresponding threaded member to permit adjustment with respect to the central actuating gear for taking up play in said control mechanism for reducing flutter tendencies of said movable tab.

10. In an aircraft anti-flutter control system, a relatively fixed airfoil, a movable surface pivotally mounted upon said airfoil, a tab pivotally mounted upon said movable surface, a threaded member operatively connected to said tab at one side of the pivotal mounting of said tab upon said movable surface, a second threaded member of opposite pitch to said first threaded member operatively connected to the opposite side of said tab, and control means including a common drive gear and secondary gears meshingly engaged with said common drive gear and operatively connected to said threaded members, one of said secondary gears having its operative connection to its threaded member arranged for relative rotational adjustment therewith for predeterminedly adjusting the rotational relationship between said common drive gear and said threaded member through the said second gear for varying the length of said threaded member for creating and maintaining a predetermined amount of pre-loading within both said threaded members.

11. In an aircraft, a movable member, an auxiliary surface pivotally mounted in the region of the trailing edge of said movable member for movement with respect thereto, anti-flutter mechanism for said auxiliary surface comprising a pair of threaded elements of opposite pitch pivotally connected to said auxiliary surface at opposite sides of its axis of pivotation, rotary means including spaced gear elements each separately adjustably associated with a terminal of one of said threaded elements, a common gear element in meshing engagement with each of said spaced gear elements, either of said spaced gear elements arranged for relative rotative adjustment with respect to said common gear element for the pre-loading of said threaded elements and arranged to maintain said pre-loaded condition for the prevention of flutter of said auxiliary surface about its axis of pivotation.

VOLNEY A. PECK.

References Cited in the file of this patent

UNITED STATES PATENTS

| Number | Name | Date |
|---|---|---|
| 143,200 | Thomas | Sept. 23, 1873 |
| 145,394 | Buffington | Dec. 9, 1873 |
| 1,333,738 | Seipp | Mar. 16, 1920 |
| 2,525,945 | Ricordel | Oct. 17, 1950 |

FOREIGN PATENTS

| Number | Country | Date |
|---|---|---|
| 418,540 | Great Britain | Oct. 26, 1934 |
| 443,178 | Great Britain | Feb. 24, 1936 |